United States Patent [19]
Finzel

[11] Patent Number: 4,784,457
[45] Date of Patent: Nov. 15, 1988

[54] CONNECTOR DEVICE FOR LIGHT WAVEGUIDES HELD WITH AN ADHESIVE

[75] Inventor: Lothar Finzel, Munich, Fed. Rep. of Germany

[73] Assignee: Siemens Aktiengesellschaft, Berlin and Munich, Fed. Rep. of Germany

[21] Appl. No.: 21,689

[22] Filed: Mar. 4, 1987

[30] Foreign Application Priority Data

Mar. 11, 1986 [DE] Fed. Rep. of Germany ....... 3608018

[51] Int. Cl.⁴ ............................................... G02B 6/38
[52] U.S. Cl. ................................ 350/96.21; 350/96.22
[58] Field of Search .................. 350/96.2, 96.21, 96.22

[56] References Cited

U.S. PATENT DOCUMENTS

| | | | |
|---|---|---|---|
| 4,657,341 | 4/1987 | Sammueller | 350/96.22 |
| 4,662,713 | 5/1987 | Davies et al. | 350/96.20 |

FOREIGN PATENT DOCUMENTS

| | | | |
|---|---|---|---|
| 0125915 | 8/1982 | Japan | 350/96.2 |
| 0002813 | 1/1983 | Japan | 350/96.2 |
| 0064808 | 4/1984 | Japan | 350/96.2 |

*Primary Examiner*—John Lee
*Assistant Examiner*—John Ngo
*Attorney, Agent, or Firm*—Hill, Van Santen, Steadman & Simpson

[57] ABSTRACT

A connector device for interconnecting a plurality of light waveguides comprises two carrier members which have aligning centering grooves for receiving waveguides which are stripped of the cladding. Each of the carrier members has a recess adjacent a rear end in which the unstripped portions of the waveguides are accepted. A first adhesive, which hardens as a very hard adhesive, is utilized for securing the waveguides in the centering grooves adjacent the first surface which will be ground to form the abutting surface and a second adhesive which is substantially softer and more elastic in the hardened condition is utilized for securing the cladded portions of the waveguide in the recess so that less stress is applied to the waveguides. The method of forming the carrier member with the waveguide includes introducing the first adhesive, preferably by capillary action, through the first surface of the carrier that will subsequently be the abutting surface and after hardening the first adhesive applying the second adhesive through the rear end.

13 Claims, 1 Drawing Sheet

CONNECTOR DEVICE FOR LIGHT WAVEGUIDES HELD WITH AN ADHESIVE

CROSS REFERENCE TO RELATED APPLICATIONS

The present application has subject matter common with applicant's copending applications, U.S. Ser. No. 21,686, filed March 4, 1987 and U.S. Ser. No. 21,829 filed Mar. 4, 1987.

BACKGROUND OF THE INVENTION

The present invention is directed to a connection element which has two carrier members, each having parallel extending centering grooves for holding light waveguides relative to an abutment surface and an arrangement for holding two carrier members with the waveguides of one member aligned with the other. Each waveguide has a cladding portion adjacent its end which is stripped away so that the waveguide may be received in the centering groove and be covered by a cover. Each carrier member opposite to the abutment surface is provided with a recess for receiving the portion of the waveguide still having the cladding and an adhesive is used for fixing the waveguides in the recess and also in the grooves of the member.

A connecting element having carrier members having V-shaped centering grooves extending parallel from an abutment surface and terminating in a recess in the carrier member is disclosed in allowed U.S. patent application Ser. No. 634,468, filed July 24, 1984, which issued on Apr. 14, 1987 as U.S. Pat. No. 4,657,341, is incorporated by reference thereto and was based on a German Application resulting in German OS No. 34 08 783. The adhesive material that was used for fixing the stripped light waveguides, which are usually optical glass fibers, must be adequately hard and must frequently even be grindable. Epoxy glue materials are preferably employed for this purpose, and these exhibit the properties desired at this location to an adequate degree.

A recess additionally applied in the region of the carrier member is shaped significantly larger and accepts the totality of the light waveguides which still have their claddings and can likewise be encased with an adhesive material. It has been shown that damage to the light waveguide fibers can occur given employment of identical adhesive material in both the region of the centering grooves as well as in the region of the adjacent recess. In particular, the risk of formation of gaps or even of fractures in the stripped glass fibers occurs in the region of the transition from the centering grooves to the larger recess. The cause of this may possibly be because the mechanical stresses are generated at the transition as a consequence of the greater volume to be hardened in the region of the recess during a shrinking process and these mechanical stresses can produce a deterioration and/or damage to the light waveguides.

SUMMARY OF THE INVENTION

The object of the present invention is to provide a way by which it is possible to avoid a deterioration or damage of the light waveguides held by an adhesive material in a carrier member. To accomplish these goals, the present invention is directed to an improvement in a connecting element for a plurality of light waveguides, said connecting element having two carriers having parallel extending centering grooves and on an edge opposite an abutting surface being provided with a recess, said light waveguides being stripped of the cladding in the portion received in the centering grooves and retaining the cladding in the area of the recess, an adhesive material being utilized to hold the waveguides in the centering grooves and the recess. The improvements are that the adhesive is two different materials with a first adhesive material, which is used for holding the waveguides in the centering groove, being a hard adhesive material and a second adhesive, which is significantly softer in comparison to the first adhesive, is used in the region of the recess.

In the region of the centering grooves, thus, the hard adhesive material which can hold the light waveguides well and can also be ground continues to be used so that a splice in the region of the joint exhibits the same attenuation properties as in the previously known arrangement. But, by contrast, any and all damage to the light waveguides in the region of the recess is avoided in that a significantly softer adhesive material is used in this region. The softer adhesive in the region of the recess will absorb a part of the tensile stresses and, in particular, also dampen mechanical oscillations that can be transmitted by the coated light waveguides, for example when they are used as overhead cables. In addition, different coefficients of expansion given changes in temperature do not have a disturbing effect in the region of the soft adhesive material.

Contrary to the previous practice, the gluing or adhesive process itself is carried out in two stages, namely with the soft adhesive in the region of the recess, which adhesive advantageously also remains largely elastic and with a hard adhesive in the region of the centering grooves. The invention is thus further directed to a method for the manufacture of a connecting element which is characterized in that the hard first adhesive material is introduced into the region of the centering grooves and is hardened, and then the second adhesive material that is significantly softer in comparison to the hard adhesive is applied from the other end into a region of the recess.

Other objects and advantages of the present invention will be readily apparent from the following description, drawings and claims.

DESCRIPTION OF THE PREFERRED EMBODIMENTS

Figure 1:
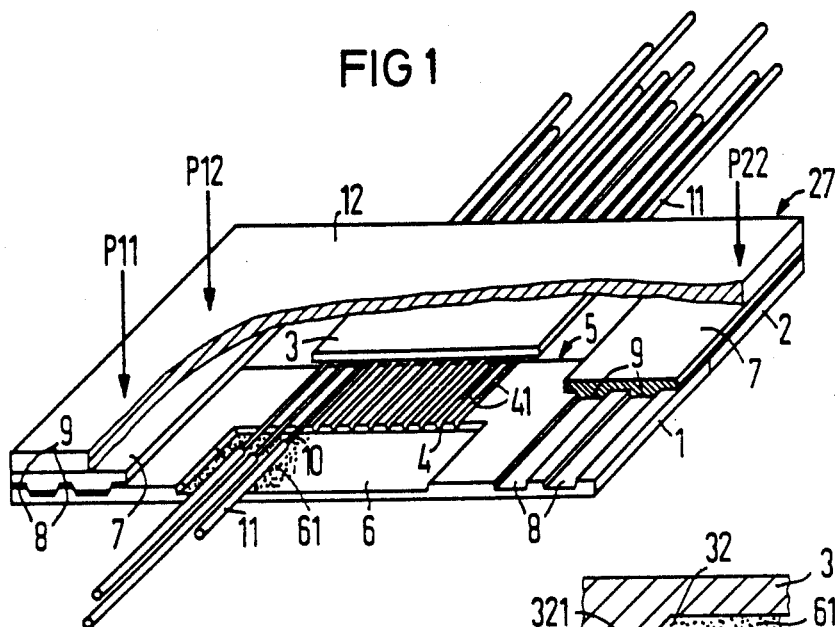
FIG. 1 is a perspective view of a connection element with portions broken away for purposes of illustration in accordance with the present invention.

The principals of the present invention are particularly useful to complete the assembly of parts to form a connector element or device generally indicated at 27 in FIG. 1. The connector device 27 has two carrier members 1 and 2, a base plate 12, which is illustration with parts being broken away in order to make the structure of the inside of the connector device clearly visible.

The two identical carrier members 1 and 2 have their end faces abutting against one another at a common parting location 5. Each of these carrier members 1 and 2, respectively, is advantageously composed of an etchable material such as, for example, silicon, to form centering grooves 4 which have a V-shape in view of the suitable etching method. These centering grooves 4 serve for the acceptance and centering of the stripped light waveguides 10. An etched-out recess 6 is located at the end of the centering groove 4 and this recess extends over the entire width of the group of centering grooves 4 and thus offers space in common for all light waveguides 10 together with their cladding layers 11.

After insertion of the waveguides 10, the centering grooves 4, as well as the recess 6, of every carrier member 1 and 2 are covered by a respective cover plate 3 after the insertion of the light waveguides 10 into the grooves 4 and this cover plate 3 is expediently glued to the particular carrier 1 or 2. In the illustrated embodiment, only a cover plate 3 for the carrier 2 is shown, whereas the cover plate for the carrier member 1 has been omitted. The adhesive, which serves the purpose of fixing the light waveguides 10, is introduced proceeding from the end face 5 of the carrier member 1 or 2, respectively. As a consequence of capillary action in the centering grooves 4 and due to the narrow gap between the cover plate 3 and the carrier member 1 or 2, respectively, the adhesive penetrates into the inside and, thus, glues the carrier member, cover plate and light waveguides to one another. The recess 6 is subsequently expediently likewise filled with adhesive material. After joining the members, waveguides and cover plates together, the unit is then ground and polished on its end face to form the parting location or surface 5. As illustrated, twelve grooves 4 are arranged side-by-side, for example, for a connector arrangement and these twelve centering grooves 4 proceed parallel to one another in the example at a mutual spacing of 0.5 mm. The length of the centering grooves 4 amount to approximately 5 mm.

Figure 2:
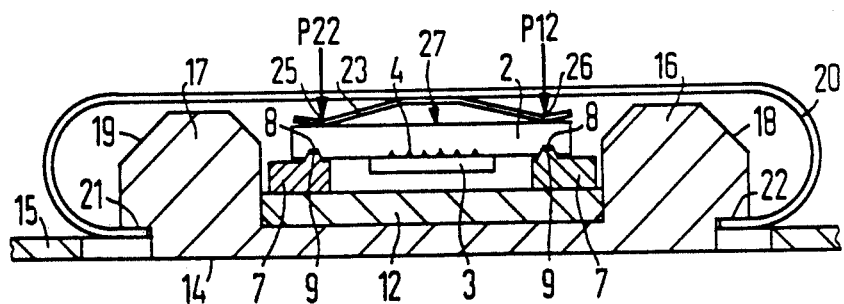
FIG. 2 is a cross sectional view of a completely assembled connection element taken through the parting plane between two carrier members of the element.

Auxiliary grooves 8, which, like the centering grooves 4, are etched and which proceed parallel to the latter, are adjacent each of the two lateral edges of the carrier members 1 and 2 and outside of the area covered by the cover plate 3. At least one auxiliary groove is provided on each side edge; two are shown in the embodiment of FIG. 1, while only one is shown in the embodiment of FIG. 2. These auxiliary grooves 8 serve the purpose of aligning the two equipped carrier members 1 and 2 by coacting with guide elements 7 having matched, correspondingly salient profiles or ridges 9 which are inserted into these auxiliary grooves 8. The guide elements 7 bridge the common parting location 5 so that both the carrier members 1 and 2 and, thus, the centering grooves 4 as well, are aligned in alignment with one another. The guide elements 7 are secured to a common base plate 12, which covers the entire splice connector. The auxiliary grooves 8 are expediently of a trapezoidal cross section and are matched to the trapezoidal profiles 9 of the guide elements 7 so that the contacting occurs only along the two lateral surfaces of each of the profiles or ridges 9. The ridges 9, as well as the grooves 8 are situated laterally at some distance from the centering grooves 4 in order to prevent moistening with the adhesive. An extremely high precision for the overall connector arrangement can be achieved by the common etching and subsequent parting of the two carrier members 1 and 2. The carrier members 1 or, respectively, 2 have dimension of about 8–9 mm given a thickness of about 0.5 mm. The cover plates 3, which are likewise composed of etchable materials such as, for example, silicon, are divided into two zones at their insides. The one zone lies planarly against the carrier member 1 or, respectively 2, and presses the stripped waveguides 10 into the centering grooves 4. The other zone is provided with a recess which covers the portion of the light waveguide that still have the jackets which are still received in the recess 6. The dimension of the cover plate amount, for example, 4–8 mm, whereby the thickness amounts to about 0.5 mm, for example in the region of the uncoated light waveguides, and amounts to about 0.3 mm in the region having the recess that overlies the recess 6.

When a releasable connection between the two carrier members 1 and 2, as well as between the guide elements 7 secured to the base plate 12 is desired, compression forces, which press these parts against one another must be provided. When a firmer pressing power is obtained, a better alignment between the parts is obtained. On the other hand, however, it must be assured that absolutely no twisting or distortion occurs in the region of the abutments of the light waveguide ends when these pressing powers take effect, because the splice attenuation would be increased as a result. The solution of this problem is by applying the compression forces only in area of the guide elements 7 as indicated by the arrows P11, P12, and P22, wherein a fourth force P21 is not illustrated, but it being mirror-inverted relative to the force P11 illustrated in FIG. 1. Since the forces P11, P12, P21, and P22 are only applied in the region of the guide elements 7 to hold the profiles or ridges 9 in the grooves 8, the abutting region in which the end faces of the light waveguides 10 abut one another remains free of forces so that an increase in the attenuation and/or deterioration are avoided in this critical region.

In order to apply the pressing forces as mentioned with regard to the forces P11, P12, P21 and P22 of FIG. 1, a structure illustrated in FIG. 2 is utilized. As illustrated, a connector element of FIG. 1 is shown inverted or turned 180° wherein a section is placed precisely along the parting plane 5. Thus, only the end face of the basic element 2 with the cover plate 3 secured thereto is visible. In a departure from the embodiment of FIG. 1, only one profile or ridge 9 and one groove 8 is provided along each of the edges of the carrier member 2.

The parts of the connector element or device 27 itself are held together in an assembled relationship by fixing means which includes receptacle means 14, which has two lateral edges or ridges 16 and 17 whose inside surfaces form a lateral detent or guide surface for the base plate 12. Each of the ridges 16 and 17 on an outer edge have undercuts 22 and 21, respectively, into which the U-shaped ends of a clamp 20 are engaged. The receptacle means 14 is received in an aperture of a splicing plate 15 which, for example, can be a component part of a splice housing or a sleeve. The clamp 20 is latched into the lateral legs or ridges 16 and 17 of the receptacle means 14, and this latching is facilitated by appropriate bevels such as 18 and 19 on the outside ridges 16 and 17. It should be pointed out that the clamps are expediently provided so that there is a clamp 20 provided for each one of the carrier members 1 and 2.

A spring clip 23 is attached, preferably by spot welding, in the middle part of the clamp 20 and the ends of the spring clip 23, which are bent over somewhat in an upward direction lie against the carrier member 2 at the contact or sealing areas 25 and 26. These seating areas 25 and 26, which actually are seating lines, are selected so that they lie in the region of the guide element 7, namely, preferably in the proximity of the profile 9 and of the auxiliary groove 8. A mechanical pressure corresponding, for example, to the force arrows P12 and P22 is thereby exerted exactly where the groove 8 and the ridge 9 engage to provide the force to align of the two carrier members 1 and 2. With this type of application of the forces, no deformation whatsoever will occur in the inside region of the carrier members 1 and 2, and the alignment of the ends of the light waveguide fibers is not deteriorated in any way whatsoever by the forces exerted by the spring clip 23. It continues to be assured that the sensitive, extremely thin and brittle carrier members 1 and 2, which are usually composed of silicon, are not subject to any bending stresses which would lead to fractures.

The clamp 20 also simultaneously serves for the external protection and for covering the overall splice connection. The spring clip 23 extends at right angles relative to the longitudinal axis of the light waveguides which are accommodated in the centering grooves 4. The transverse extent of the spring clip 23 is expediently selected so that it extends only over a part of the length of the associated carrier member 1 or 2, for example for about 50% of the length of the carrier member. The spring properties of the clamps 20 are expediently selected so that they are significantly stiffer than the respective spring clip 23 so that the spring clip 23 should exhibit a considerable lower spring constant than the clamp 20. It is also expedient in this context to select a softer material for the spring clip 23 and/or a material which is thinner in cross section than for the relatively stiff clamp 20 and/or to make the spring clip 23 less broad than the clamp 20. The spring clip 23 can also be fashioned with slots in the outside region adjacent to the seating locations 25 and 26.

As mentioned above, the adhesive material is used both in the region of the centering grooves 4 as well as in the region of the recess 6 in order to secure the light waveguides in position. The adhesive material that is introduced into the grooves 4 from the abutment surface 5 is indicated by shading in FIG. 1 and is identified as 41, while the adhesive material in the region 6 is indicated by shading 61. For the adhesive material 41, which surrounds the optical fibers in the grooves 4, particularly adjacent the abutting surface 5, a material which is especially hard in a harden condition is used. This adhesive material hardens glass hard and can be ground in its hardened condition. A hardening epoxy resin is particularly suitable for this purpose. In this hardened condition, these should exhibit a BARCOL hardness of a range between 20 and 35, preferably in a range of 25 and 30. The identification of the Barcol hardness occurs in accordance with ASTMD 2583. The adhesive material 41 should not proceed into the recess 6 and, thus, should only be present in the sub-areas around the end face 5 of the centering grooves 4. The adhesive material 41 is first introduced and hardened, whereby the hardening for the epoxy resin occurs within 20 minutes at a temperature 80° C. and correspondingly faster at higher temperatures.

The second adhesive material 61, which is utilized in the area of the recess 6 should be significantly softer than the adhesive material 41 and insofar as possible, should still remain flexible in its hardened condition. What is prevented in this way is that undesirable forces are exerted on the stripped, i.e., bare, optical fibers 10 during the hardening or setting process. Silicone rubber can preferably be utilized as the adhesive 61, and this remains largely elastic in its set condition, and therefore avoids any ad all types of shearing forces in the region of the transition from the recess 6 to the centering grooves 4. In its hardened condition, the adhesive material 61 in the area of the recess 6 should exhibit only between 2 and 20% of the hardness exhibited by the adhesive material 41 in the region of the centering grooves 4. A Shore-A hardness of the hardened adhesive material 61 should expediently be selected to be in a range between 12 and 25.

Figure 3:
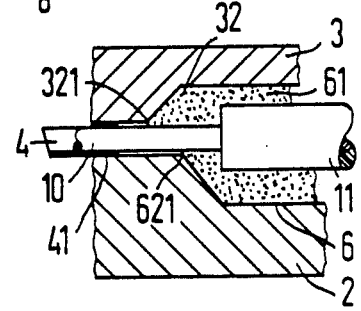
FIG. 3 is an enlarged, partial cross sectional view taken along the axis of a centering groove with portions in elevation for purposes of illustration showing transition between the recess and adjacent centering groove.

In addition to the utilization of different adhesive materials 41 and 61 in the centering groove 4 and in the recess 6, and independent as well, the mechanical stressing of the bare light waveguides 10 can also be diminished in that the transition location between the grooves 4 and recess 6 is appropriately shaped. As best illustrated in FIG. 3, this part of the carrier member 2 and the cover 3 lying in the initial region of the centering groove 4 in which the stripped optical fiber 10 is arranged is shown. The recess 6 has an end wall, which proceeds somewhat obliquely in the direction toward the centering groove 4, and this end wall merges with the centering groove 4 at a point 621. The cover 3, which is pressed on top of the stripped light waveguides 10, should have a recess such as 32 which has a sloping end wall that terminates at a point 321 adjacent to the surface of the cover engaging fibers in grooves 4. The recesses 6 and 32 are dimensioned so that overall neither of the light waveguides 10 nor its cladding 11 will strike or contact against the cover or against the carrier member 2 in the region of each of the recesses. The recess 32 of the cover 3, however, does not end at the same location 621 as the recess 6 of the base body 2, but ends offset therefrom in a longitudinal direction of the axis of the light waveguide 10, namely at the location 321. As a result thereof, the light waveguide 10 is not firmly clamped at two points lying diametrically opposite one another, but is initially held at only one side from the point 621 to the point 321, and only at the point 321 is it firmly clamped at the end of the recess 32. This yields the additional possibility that potential forces, which could or still occur in the elastic and relatively soft adhesive material 61, are at least superficially distributed over a certain length of the light waveguide 10, and thereby damages can be reliably excluded or reduced.

Although various minor modifications may be suggested by those versed in the art, it should be understood that I wish to employ within the scope of the patent granted hereon, all such modifications as reasonably and properly come within the scope of my contribution to the art.

I claim:

1. In a connector device for interconnecting two groups of light waveguides, said device having two carrier members having centering grooves extending from an abutting surface to a rear surface, a recess adjacent said rear surface so that the centering grooves can receive stripped waveguides while the cladded portion of the waveguide can be received in the recess, adhesive material being provided for securing of the cladded portions of the waveguides in the recess and the stripped portions of the waveguides in the centering groove, and means for positioning the two carrier members with the abutting surfaces in abutting relationship and the waveguides of one member being aligned with waveguides of the other member, the improvements comprising the adhesive material being used for securing the waveguides in the centering groove being a first adhesive material, which is a hard adhesive material and the adhesive material being used for securing the cladded waveguides in the recess being a second adhesive material which is softer than the first adhesive material.

2. In a connector device according to claim 1, wherein the second adhesive material is selected of a material which remains elastic in its hardened condition.

3. In a connector device according to claim 1, wherein the first adhesive material is a grindable adhesive material that hardens to a glasshard.

4. In a connector device according to claim 1, wherein the first adhesive material is a hardenable epoxy resin.

5. In a connector device according to claim 1, wherein the second adhesive material is a silicone rubber.

6. In a connector device according to claim 1, wherein the second adhesive material in the hardened condition has a hardness in a range of between 2 and 20% of the hardness of the hardened first adhesive material.

7. In a connector device according to claim 1, wherein the first adhesive material in a hardened condition exhibits a Barcol hardness in a range of between 20 and 35.

8. In a connector device according to claim 7, wherein the first adhesive material exhibits a Barcol hardness in a range of between 25 and 30.

9. In a connector device according to claim 1, wherein the second adhesive material in a hardened condition exhibits a Shore hardness A in a range of between 12 and 25.

10. In a connector device according to claim 1, which includes a common cover plate for each of the carrier members, said cover plate covering both a first region of the carrier member having the centering groove as well as a second region of the carrier member having the recess.

11. In a connector device according to claim 10, wherein the cover plate has a recess overlying the second region and the recess in the carrier member, said recess in the cover member extending toward the abutting surface a greater distance than the recess in the carrier member so that the end walls of the two recesses are offset relative to one another and are offset along an axis of the waveguides.

12. A method of mounting optical waveguides in a carrier plate for a connector device, said method comprising providing a carrier member having a plurality of centering grooves extending to a first surface and a recess covering the width of the said grooves along a rear surface of the member, placing waveguides stripped of their cladding in the grooves with the waveguide portion retaining the cladding received in the recess, introducing a first adhesive into the centering grooves, hardening the first adhesive material and then filling the recess with a second adhesive material which is significantly softer in comparison to the first adhesive material.

13. A method according to claim 12, which includes prior to the step of introducing a first adhesive material, applying a cover over the waveguides contained in the centering grooves, said cover extending over the recess in the member, and wherein the step of introducing a first adhesive material introduces the first adhesive through the first surface by a capillary action into the grooves over a sub-length of the grooves and the step of filling the recess includes inserting the second adhesive material from the rear surface between the carrier member and cover.

* * * * *